US006378185B1

(12) United States Patent
Ratchovsky et al.

(10) Patent No.: US 6,378,185 B1
(45) Date of Patent: Apr. 30, 2002

(54) HYDRAULIC DISC BRAKE CALIPER PISTON RETRACTOR TOOL

(76) Inventors: James Ratchovsky; Robert Ratchovsky, both of 2917 So. Princeton Ave., Chicago, IL (US) 60616

(*) Notice: Subject to any disclaimer, the term of this patent is extended or adjusted under 35 U.S.C. 154(b) by 0 days.

(21) Appl. No.: 09/569,773

(22) Filed: May 12, 2000

Related U.S. Application Data

(60) Provisional application No. 60/134,860, filed on May 19, 1999.

(51) Int. Cl.[7] .................................... B23P 19/04

(52) U.S. Cl. .................................... 29/239

(58) Field of Search ................ 29/239, 252, 238; 254/93 R

(56) References Cited

U.S. PATENT DOCUMENTS 3,081,066 A * 3/1963 Murawski ................. 254/93 R
3,574,915 A * 4/1971 Jeal ......................... 254/93 R
3,762,688 A * 10/1973 Leonhardt .................. 29/239
5,345,985 A * 9/1994 Murphy ..................... 254/93 R
6,134,764 A * 10/2000 Rivera ......................... 29/239
6,195,863 B1 * 3/2001 Blake .......................... 29/239

* cited by examiner

*Primary Examiner*—Robert C. Watson
(74) *Attorney, Agent, or Firm*—Leydig, Voit & Mayer, Ltd.

(57) ABSTRACT

A hand tool for use in servicing automotive-type disc brakes, and particularly for retracting the brake piston into its associated caliper. The hand tool include a pair of spreader plates which have a first position in which they are closely proximate one another, and a second position in which they are spread sufficiently to force a brake piston into its caliper body. The spreader plates have extended portions which are shaped and sized to extend into the caliper in the place of the disc pads which normally reside in the caliper. A hydraulic actuator interconnects the spreader plates, and is operated by a trigger-like mechanism. In operation the extended portions of the spreader plates are inserted into the caliper, and the trigger operated to drive a movable plate with respect to a fixed plate, utilizing the force of the hydraulic cylinder to spread the plates and thereby force the brake piston back into its caliper.

10 Claims, 1 Drawing Sheet

HYDRAULIC DISC BRAKE CALIPER PISTON RETRACTOR TOOL

CLAIM OF PRIORITY TO PRIOR APPLICATION

This application claims the benefit of U.S. Provisional Application Ser. No. 60/134,860, filed May 19, 1999, the disclosure of which is hereby incorporated by reference.

FIELD OF THE INVENTION

This invention relates to hand tools and more particularly to a tool for use in disc brake repair.

BACKGROUND OF THE INVENTION

On automobiles equipped with front disc brakes, the piston must be retracted back into the caliper to facilitate the installation of the new brake pads. Typically a good deal of force is required to retract the piston, and the force must be exerted along a line generally parallel to the piston axis. Due to the structure of the caliper which encloses the piston, it is not a straightforward task to apply the necessary force along the proper line to readily retract the piston. While various hand tools might be used to pry the piston back into its caliper, there is the chance of damaging the face of the piston which would have the adverse effect of distorting the piston face which is to bear against the rear surface of the new brake pad.

SUMMARY OF THE INVENTION

In view of the foregoing, it is a general aim of the present invention to provide a hand tool with a power assist capable of readily and reliably retracting the piston into the caliper of a standard automotive-type brake caliper.

In greater detail, it is an object to provide a hand tool with a power assist mechanism for generating the necessary force without requiring extraordinary strength on a part of the user.

A further object is to provide a tool which is relatively simple to use and reasonably inexpensive to acquire.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Turning now to the drawings, there is shown a hand tool 20 which is particularly suited for retracting the piston of an automotive-type disc brake system into the caliper. The tool 20 has a main body 21 and a pair of handles 22, 23 which allow gripping of the tool and actuation of an advance mechanism. Slidably supported on the body 21 of the tool 20 is a spreader plate assembly 25. As suggested by the solid and dashed lines, the spreader plate assembly 25 has a normally retracted position identified as 25*a,* and an extended position identified as in dashed lines by 25*b.*

Figure 2:
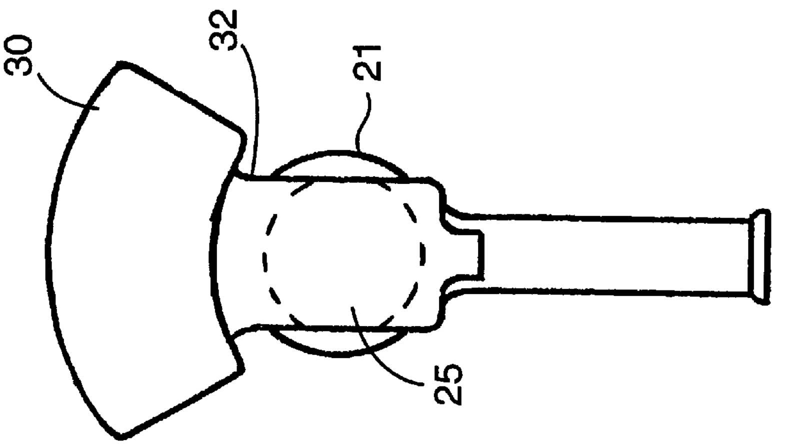
FIG. 2 is an end elevation of the tool of FIG. 1.
Figure 1:
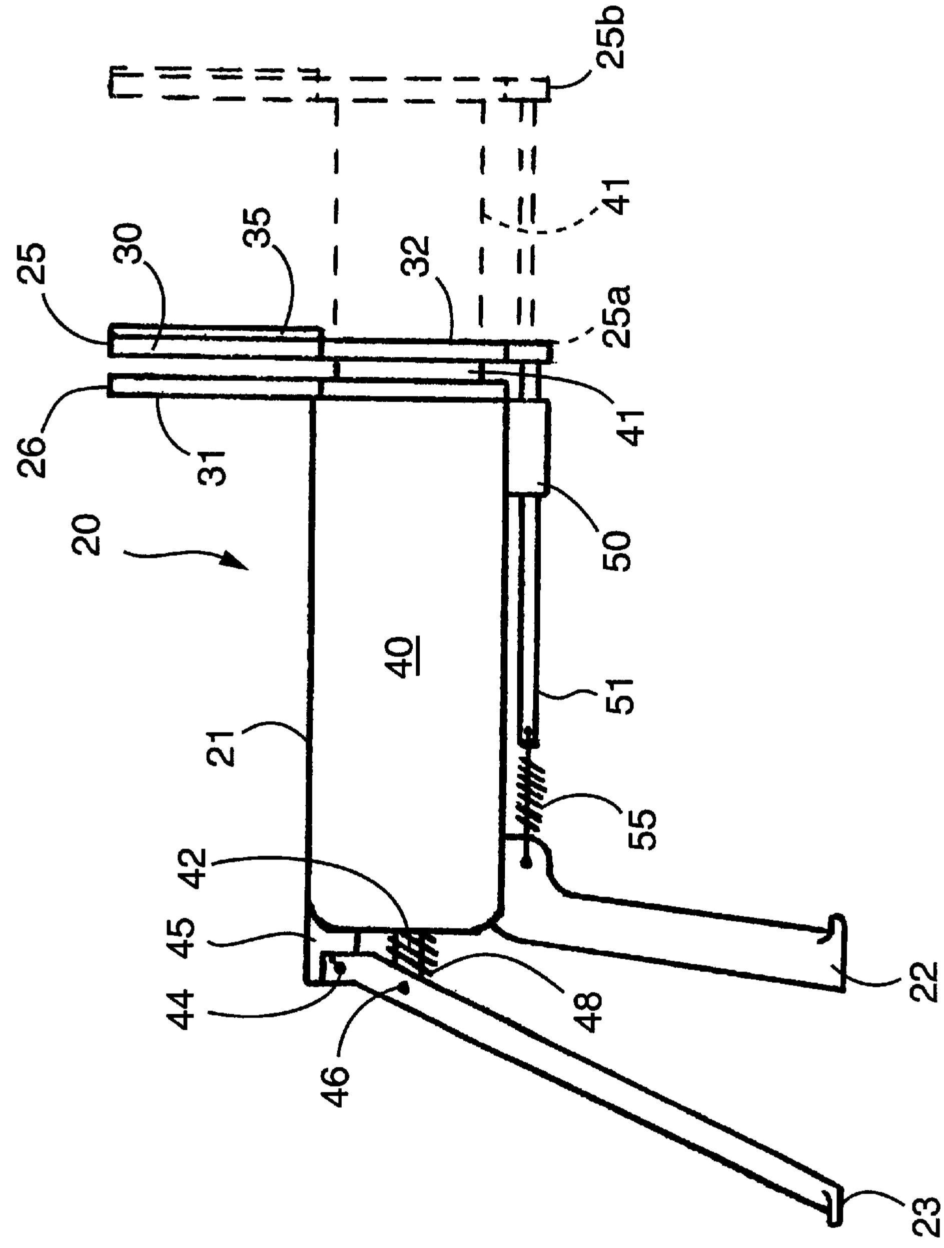
FIG. 1 is a side elevation of a hydraulic disc brake caliper piston retractor tool exemplifying the present invention, and showing the spreader plate in retracted position in full lines and in extended positions in dashed lines.

As best shown in FIG. 2, the spreader plate 25 includes a disc-pad-shaped segment 30 which is positioned clear of the body 21, and a connecting portion 32 which extends to the body 21 of the tool 20. Affixed to the body 21 is a similar spreader plate 26. The spreader plate 26 can also have a disc shape segment 31. In the preferred embodiment, the spreader plate 26 is fixed to the body 21 by any convenient arrangement. A protective covering 35 can be formed on the segment 30 to prevent mechanical damage to the piston face with which it will come in contact.

In accordance with the invention, the body 21 includes a hydraulic actuator or cylinder 40 having an actuator piston or ram 41 coupled to the connecting segment 32 of the movable spreader plate 25. The piston 41 projects through an aperture in the fixed spreader plate 26, or otherwise is allowed to pass the fixed spreader plate for driving the movable spreader plate.

The hydraulic actuator 40 can be of the type which is utilized in small bottle jacks, and to that end has an actuating rod 42 coupled to the actuator 40 and capable, when pumped, of extending the piston 41. In keeping with using readily available and inexpensive commercial components, the hydraulic actuator or ram 40 is capable of producing on the order of 500 pounds of force as it is pumped up by reciprocation of the actuating rod 42.

For providing a mechanism for reciprocating the actuating rod 42, the handles 22, 23 are adapted to be gripped by a single hand of an operator. In the illustrated embodiment, the handle 22 is fixed to the body 21, and the handle 23 is pivoted at 44 to an extension 45 of the body 21. A further pivot pin 46 also connects the handle 23 to the actuator rod 42. Thus, when the hand which manually grips the handles 22, 23 exerts a squeezing force on the handles, the handle 23 moves toward the handle 22 to cause the actuator rod 42 to be driven inwardly, which serves to pump the hydraulic cylinder and begin to extend the piston 41. A spring 48 causes the return of the handle 23 as the grip is released. By repetitive trigger action the actuator rod is pumped to extend the piston to the extent needed to retract the brake piston. Typical travel of 3 inches or less is all that is required.

It will be seen that in the preferred embodiment a guide 50 and guide rod 51 are also provided. The guide 50 is preferably fixed to the body 21 and closely fits about the guide rod 51 which is fixed to the movable spreader plate 25. The guide arrangement thus maintains the movable spreader plate in the same angular attitude (see FIG. 2) as the fixed spreader plate. In addition, a closely fitting guide also serves to counterbalance some of the off center forces produced by the hydraulic actuator 40 acting along a line which is displaced from the center line of the brake caliper piston.

In use, a standard automotive caliper is to have its piston retracted in the ordinary course of rebuilding a set of automotive-type brakes. The caliper is removed from the rotor, and the disc pads are removed from the caliper. The spreader plates 25, 26 are then inserted into the caliper in the same way that a new set of disc pads would be inserted. After the tool is properly inserted with the disc pads in the place of the removed pads, the trigger mechanism 22, 23 is pumped, which serves to extend the piston 41 from the hydraulic actuator 40. The movable spreader plate thereupon advances, while the fixed spreader plate serves as a base to create a force against the piston in the caliper which causes it to retract into the body of the caliper. When the piston is sufficiently retracted into the caliper, acting through trigger 23 or other mechanism on the actuator, the advanced force is released. Means are provided for automatically retracting the movable spreader when the hydraulic force on the actuator is released. In the illustrated embodiment, that means is shown as a return spring 55 connecting the guide rod 51 to a fixed portion of the body 21. When the force on the hydraulic actuator is released, and the spring 55 returns the advance spreader plate to its original position, the tool can be readily removed from the caliper, following which the caliper can be returned to the rotor, and pads can be installed in the ordinary course.

In the illustrated embodiment, it is convenient to show the spreader plates as a pair, having a fixed plate 26 and a movable plate 25. The location of the fixed and movable spreaders is less significant than the fact that the spreader plates are movable with respect to each other. Indeed, in some implementations, both pads can be movable, or the movable and fixed pads reversed in position. The important factor is the creation of an apparatus within the caliper in which two members serve to exert a force which results in the brake piston being retracted into the caliper.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hand tool for retracting a piston into a caliper housing of an automotive-type hydraulic brake, and comprising in combination:

a pair of planar spreader plates of a size and generally arcuate segment shape adapted to be inserted into the caliper in place of disc pads normally positioned in the caliper;

the spreader plates being mounted on a body in such a way that they are movable with respect to each other from a first compressed position in which the spreader plates are proximate for joint insertion within a caliper, and a second position in which the spreader plates are spread sufficiently to retract a brake piston into its caliper;

a hydraulic actuator in the body and connected to at least one of the spreader plates for spreading the plates from the first to the second position with force sufficient to retract a piston into its caliper, and a hand operator connected to the hydraulic actuator for controllably advancing the spreader plates to thereby retract the piston.

2. The combination of claim 1 in which a first spreader plate is fixed to the body and a second spreader plate is attached to the hydraulic actuator so that operation of the actuator advances the movable spreader plate with respect to the fixed spreader plate.

3. The combination as set forth in claim 2 in which at least the movable spreader plate has an operating section extended beyond the body and capable of being inserted into a caliper, the operating section being shaped in the form of a conventional disc brake pad.

4. The combination of claim 2 further including a guide mechanism connecting the body to the movable spreader plate for maintaining alignment of the movable spreader plate as it advances away from the fixed spreader plate.

5. The combination as set forth in claim 4 further including a return spring positioned between the body and the movable spreader plate for retraction of the spreader plates from the second to the first position.

6. A self-contained hand tool for retracting a piston into a caliper housing of an automotive-type hydraulic brake, and comprising in combination:

a pair of planar spreader plates of a size and generally arcuate segment shape adapted to be inserted into the caliper in place of disc pads normally positioned in the caliper;

the spreader plates being mounted on a body in such a way that they are movable with respect to each other from a first compressed position in which the spreader plates are proximate for joint insertion within a caliper, and a second position in which the spreader plates are spread sufficiently to retract a brake piston into its caliper;

a unitary hydraulic actuator in the body having an operating ram and an actuator rod which causes the advance of the operating ram when the actuator rod is reciprocated;

the hydraulic ram being connected to at least one of the spreader plates for spreading the plates from the first to the second position with force sufficient to retract a piston into its caliper; and a hand operator connected to the actuator rod such that movement of the hand operator reciprocates the actuator rod for controllably advancing the hydraulic ram to advance the spreader plates and thereby retract the piston.

7. The combination of claim 6 in which a first spreader plate is fixed to the body and a second spreader plate is attached to the operating ram so that operation of the actuator rod advances the movable spreader plate with respect to the fixed spreader plate.

8. The combination as set forth in claim 7 in which at least the movable spreader plate has an operating section extended beyond the body and capable of being inserted into a caliper, the operating section being shaped in the form of a conventional disc brake pad.

9. The combination of claim 7 further including a guide mechanism connecting the body to the movable spreader plate for maintaining alignment of the movable spreader plate as it advances away from the fixed spreader plate.

10. The combination as set forth in claim 9 further including a return spring positioned between the body and the movable spreader plate for retraction of the spreader plates from the second to the first position.

* * * * *